O. HAYES.
MACHINE FOR HEADING KAFIR CORN.
APPLICATION FILED FEB. 19, 1913.

1,090,709.

Patented Mar. 17, 1914.

3 SHEETS—SHEET 1.

Fig. 1.

Witnesses

Orval Hayes,
Inventor by C. A. Snow & Co.
Attorneys

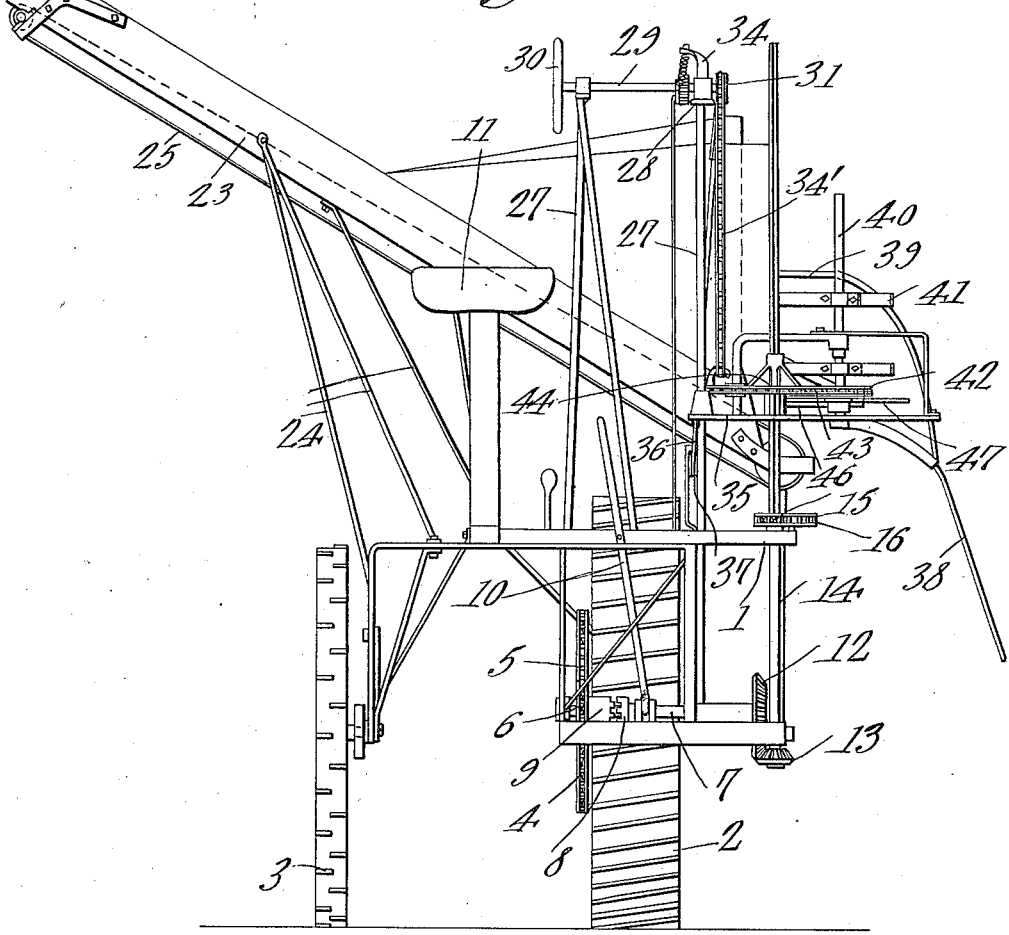

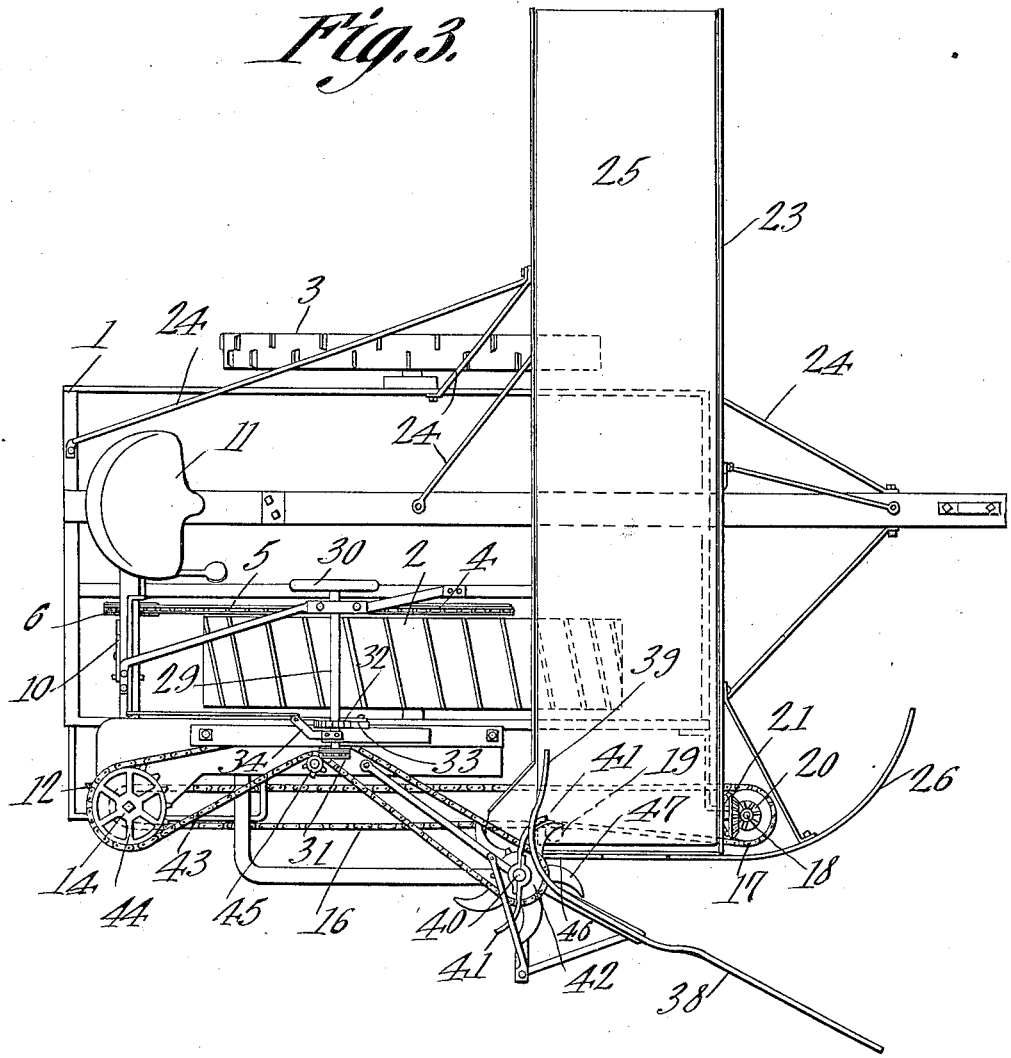

UNITED STATES PATENT OFFICE.

ORVAL HAYES, OF BRAMAN, OKLAHOMA.

MACHINE FOR HEADING KAFIR CORN.

1,090,709.  Specification of Letters Patent.  Patented Mar. 17, 1914.

Application filed February 19, 1913. Serial No. 749,427.

*To all whom it may concern:*

Be it known that I, ORVAL HAYES, a citizen of the United States, residing at Braman, in the county of Kay and State of Oklahoma, have invented a new and useful Machine for Heading Kafir Corn, of which the following is a specification.

This invention relates to machines for heading Kafir corn and the like while standing in the field, one of the objects of the invention being to provide improved means whereby the heads or tops of the corn can be removed efficiently and directed onto an elevator which constitutes means for directing the severed tops into a wagon or other receptacle provided therefor.

Another object is to provide a machine of this character which can be adjusted readily so as to act upon corn of different heights.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown. In said drawings:—Figure 1 is a side elevation of the machine. Fig. 2 is a rear elevation thereof. Fig. 3 is a plan view.

Referring to the figures by characters of reference 1 designates the main frame of the machine, the same being supported by wheels 2 and 3. A sprocket 4 rotates with the wheel 2 and is adapted to transmit motion through a chain 5 to another sprocket 6 mounted on a counter shaft 7 journaled on the frame 1. This sprocket 6 is loose on the shaft and a clutch member 8 is feathered on said shaft and is adapted to be shifted into or out of engagement with a clutch member 9 extending from the sprocket so as to couple the sprocket to or release it from the shaft. This clutch member 8 can be shifted by means of a lever 10 extending to a point where it can be conveniently reached by a person occupying the seat 11.

A gear 12 is secured to shaft 7 and meshes with another gear 13 fastened to the lower end of an upwardly extending shaft 14. This shaft is journaled in the frame 1 and has a sprocket 15 secured to it close to the top of the frame 1. This sprocket transmits motion through a chain 16 to another sprocket 17 secured to an upwardly extending shaft 18 which is journaled in the front portion of the frame 1. The chain 16 may be held taut by an idler 19 as shown in Fig. 3.

A gear 20 is secured to the upper end of shaft 18 and meshes with another gear 21 revoluble with a roller 22 extending across the lower end of an elevator frame 23. This frame is fixedly connected to the frame 1 by means of braces 24 suitably arranged. An endless apron 25 is mounted on the roller 22 and extends upwardly within the frame 23. As shown in Fig. 3, the elevator extends beyond one side of the frame 1 so that any material carried upwardly thereby and discharged from the upper end thereof will be free to drop into a wagon box or other receptacle arranged at one side of the machine. A forwardly and laterally curved guard arm 26 is secured to the lower end of the elevator frame 23 and serves to deflect a portion of the corn into position to be engaged by the cutting mechanism hereinafter described.

Fixedly connected to the frame 1 and extending upwardly thereabove are parallel guide posts 27 connected at their upper ends by a top strip 28 on which a shaft 29 is journaled. This shaft has a hand wheel 30 secured thereto and is also provided with a sprocket 31. A ratchet wheel 32 is secured to the shaft and is normally engaged by a pawl 33 carried by a spring controlled lever 34. Sprocket 31 is engaged by a chain 34′ one end of which is secured to a table 35 which is mounted to slide upwardly and downwardly on the guide posts 27. This table is also slidably mounted on the shaft 14, said shaft being extended upwardly to a point above the top plate 28 and that portion of the shaft 14 located above sprocket 15 being angular in cross section but mounted to freely rotate within the table. As before stated, one end of chain 34′ is connected to the table 35. The other end of the chain has a cable 36 or the like attached thereto, this cable extending downwardly under a guide sheave 37 arranged below the path of movement of the table and being then extended upwardly and attached to the bottom of the table. Thus it will be seen that when the shaft 29 and sprocket 31 are rotated in one direction, the chain 34′ will be drawn upwardly so as to elevate the table while cable 36 will be paid out. When chain 34' is lowered the table will move downwardly and the cable 36 will be taken up. Thus it will be seen that the table is moved positively in either direction.

Extending from the front end of the table is a forwardly and downwardly inclined guard arm 38, this arm diverging laterally relative to the arm 26, as shown clearly in Fig. 3. Fingers 39 extend upwardly from the rear portion of the guard arm 38 and are curved laterally to points above the lower portion of the elevator frame 23. An upwardly extending shaft 40 is journaled on the table 35 close to and back of the fingers 39 and carries the upper and lower curved arms 41 of a reel, these arms being movable between the fingers 39 and between said fingers and the arm 38. A sprocket 42 is secured to the shaft and receives motion, through a chain 43, from a sprocket 44 which is slidably mounted on but rotates with the shaft 14. Chain 43 is held taut by an idler 45.

A stationary knife 46 is extended from the table and across the lower end portion of the elevator frame 23 and secured to the shaft 40 so as to successively coöperate with blade 46 during the rotation of the shaft, are curved blades 47. Preferably five of these blades extend from the shaft 40 although it is to be understood that this number may be increased or diminished as desired. A backing plate 48 is secured to the blade 46 in advance of the path of the blade 47 and has its front end tapered as shown in Fig. 1.

It will be apparent from the foregoing description that when the machine moves forward, motion will be transmitted from wheel 2 through sprocket 4, chain 5 and sprocket 6, to the counter shaft 7, provided the clutch members 8 and 9 are in engagement with each other. Counter shaft 7 will transmit motion through gears 12 and 13 to the upwardly extending shaft 14 so that chains 16 and 43 will be operated and motion thus transmitted to the elevator apron 25 and to the shaft 40 and the blades 47 thereon. During the forward movement of the machine the corn in the path of the arms 26 and 38 will be gathered inwardly toward the path of the blades 47 and at the lower end of the apron 25. As the blades 47 operate they cut the tops of the corn upon the stationary blade 46 and these tops are thrown by the arms 41 of the reel so as to fall onto the apron 25. The apron thus conveys the tops upwardly and discharges them into a wagon box or the like arranged at one side of the machine. By operating the shaft 29 in the manner hereinbefore described, the table 35 can be raised or lowered so that the cutting mechanism will be brought into position to cut corn of different heights.

What is claimed is:—

1. A machine for topping corn, including a wheel supported structure, an elevator extending upwardly and laterally therefrom, a vertically adjustable table, fixed and revoluble cutting elements carried by the table, a reel revoluble with the revoluble cutting element for directing severed tops onto the elevator, a guard arm extending across the receiving end of the elevator and curved forward and laterally therefrom, another guard arm carried by the table and extending forwardly, downwardly and laterally, said guard arms constituting means for gathering the stalks of a row into position to be acted on by the cutting elements, fingers extending from the back portion of the last named guard arm and extending laterally toward the elevator, said reel having arms movable between the fingers, and means for actuating the movable cutting element.

2. A machine for topping corn including a wheel supported structure, an elevator extending upwardly and laterally therefrom, a table mounted for vertical adjustment relative to the structure, fixed and movable cutting elements carried by the table, said fixed element extending across the receiving end of the elevator, a backing plate upon the fixed element, a reel revoluble with the movable cutting element for directing severed tops onto the elevator, a guard arm extending across the receiving end of the elevator and curved forwardly and laterally therefrom, another guard arm carried by the table and extending forwardly, downwardly and laterally, said guard arms constituting means for gathering the stalks of a row into position to be acted on by the cutting elements, fingers extending from the back portion of said last named guard arm and extending laterally toward the elevator, said reel having arms movable between the fingers, and means for transmitting motion to the movable cutting element from one of the supporting wheels irrespective of the adjustment of the table, the elevator being located entirely at one side of the gathered stalks.

In testimony that I claim the foregoing as my own, I have hereto affixed my signature in the presence of two witnesses.

ORVAL HAYES.

Witnesses:
  H. G. FISHER,
  ALPHA HAYES.

---

Copies of this patent may be obtained for five cents each, by addressing the "Commissioner of Patents, Washington, D. C."